Dec. 2, 1969 C. W. DAVID ET AL 3,481,083

APPARATUS FOR AND METHOD OF FINISHING MEMORY DISCS

Filed Sept. 16, 1966 8 Sheets-Sheet 1

INVENTORS:
Charles W. David
Eugene A. Munson

By Smyth, Roston & Pavitt

ATTORNEYS

APPARATUS FOR AND METHOD OF FINISHING MEMORY DISCS

Filed Sept. 16, 1966 8 Sheets-Sheet 2

INVENTORS:
Charles W. David
Eugene A. Munson
By Smyth, Roston & Pavitt
ATTORNEYS Dec. 2, 1969 C. W. DAVID ET AL 3,481,083

APPARATUS FOR AND METHOD OF FINISHING MEMORY DISCS

Filed Sept. 16, 1966 8 Sheets-Sheet 3

INVENTORS:
Charles W. David
Eugene A. Munson
By Smyth, Roston & Pavitt
ATTORNEYS

APPARATUS FOR AND METHOD OF FINISHING MEMORY DISCS

INVENTORS:
Charles W. David
Eugene A. Munson
By Smyth, Roston & Pavitt
ATTORNEYS

APPARATUS FOR AND METHOD OF FINISHING MEMORY DISCS

INVENTORS:
Charles W. David
Eugene A. Munson
By Smyth, Roston & Pavitt
ATTORNEYS Dec. 2, 1969 C. W. DAVID ET AL 3,481,083

APPARATUS FOR AND METHOD OF FINISHING MEMORY DISCS

Filed Sept. 16, 1966 8 Sheets-Sheet 6

INVENTORS:
Charles W. David
Eugene A. Munson
By Smyth, Roston & Pavitt
ATTORNEYS INVENTORS:
Charles W. David
Eugene A. Munson
By [signature]
ATTORNEYS INVENTORS:
Charles W. David
Eugene A. Munson
By Smyth, Roston & Pavitt
ATTORNEYS United States Patent Office 3,481,083

Patented Dec. 2, 1969

3,481,083

APPARATUS FOR AND METHOD OF FINISHING MEMORY DISCS

Charles W. David, Marina Del Rey, and Eugena A. Munson, Torrance, Calif., assignors, by mesne assignments, to MRX Corporation, Hawthorne, Calif., a corporation of California Filed Sept. 16, 1966, Ser. No. 579,908
Int. Cl. B24b *7/04, 9/00, 5/00*
U.S. Cl. 51—62 12 Claims

ABSTRACT OF THE DISCLOSURE

This disclosure describes a finishing apparatus which is particularly adapted for abrasively finishing memory discs. The machine includes means for mounting the memory disc for rotation about the axis thereof, an abrasive, and means for reciprocating the abrasive generally radially of the disc while the disc is rotating.

As is well known, memory discs are thin annular metal members having a thin oxide coating on the faces thereof. Information is recorded on these faces by a recording head that "flies" over a laminar air film on the face of the disc.

In the manufacture of memory discs, an annular metal member is coated with a thin layer of a suitable recording material, such as a magnetic oxide dispersion. To make the disc suitable for recording purposes, it is necessary to provide a very smooth layer of the recording material on the disc. The recording material which is usually applied by a spraying apparatus is not sufficiently smooth for recording purposes. Accordingly, it is necessary to finish or smooth out the recording material on the disc faces.

This invention relates to an appartus for and a method of finishing memory discs and more particularly to a novel apparatus and method for abrasively removing a finite layer of recording material from each of the disc faces, thereby leaving a smooth, even layer of recording material on the faces of the disc.

One prior art type of finishing machine employed a turntable for supporting the disc and an abrasive member engageable with one of the faces of the disc. The abrasive member and the turntable rotate simultaneously about different rotational axes to remove a layer of the recording material from the face of the disc.

This prior art type device has been found unsatisfactory for several reasons. First, with this prior art device, the faces of the disc are finished sequentially, rather than simultaneously, and accordingly, the finishing operation takes considerable time. Secondly, when one of the faces of the disc is finished, the operator must invert the disc on the turntable so that the other face thereof can be exposed to abrasive action. This further lengthens the time required for the finishing operation. In addition, it is necessary that memory discs be kept surgically clean to allow them to perform the recording operation properly. It is desirable, therefore, that the handling of the disc be kept to an absolute minimum to avoid increasing the chances of contaminating or scratching the discs. Thus, the handling required in inverting the disc on the turntable is undesirable.

In using abrasive members to finish a memory disc, small scratches in the surface of the recording material on the disc are normally and inherently produced. Whenever two, three-micron scratches intersect, a fault is produced in the recording surface that produces noise. Accordingly, it is desirable that these small scratches intersect a minimum number of times to hold the number of faults at a minimum.

The prior art finishing machine produces memory discs that are inherently noisy because many of the small scratches intersect to produce faults in the discs. This is so because the abrasive member and the disc are rotated simultaneously about different rotational axes. Accordingly, each of the small scratches on the face of the disc extends radially and circumferentially and the scratches overlap each other many times upon successive revolutions of the disc. Thus, many faults are produced and the memory disc is inherently noisy.

Another difficulty with rotating the abrasive member and the disc about different axes is that scratches are formed on the disc in random fashion. In addition, with this system the abrasive member must be moved relatively slowly with respect to the disc and this increases the time required for the finishing operation. This relatively slow speed necessitates use of a relatively coarse abrasive which increases the possibility of producing a large scratch in the disc which may cause a blank portion on the disc on which no information can be recorded.

According to the present invention, all of the above-noted problems are eliminated. More particularly, with the present invention both faces of the memory disc are simultaneously finished, thereby substantially reducing the amount of time required for the finishing operation. This also eliminates handling of the disc during the finishing operation, and accordingly, the chances of contaminating the disc or of scratching or otherwise damaging the same are substantially reduced.

The present invention produces memory discs which are much less noisy than those produced by the prior art devices discussed above. This advantage is achieved in part by minimizing the number of times that the scratches produced by the abrasive member intersect. Although the scratches intersect a minimum number of times, the surface finish on the faces of the disc so produced is very smooth.

With the present invention, memory discs are finished faster and are provided with a better recording surface. This effect is achieved in part by rotating the disc while rapidly reciprocating the abrasive member generally radially through short strokes. Thus, any scratch formed in the disc will extend generally circumferentially of the disc with the short radial strokes of the abrasive causing any scratch, which is produced to wobble or zig-zag slightly as it extends circumferentially. This allows high speed movement of the abrasive member relative to the disc which increases the speed with which the finishing operation can be completed and permits use of a fine abrasive is desirable because it reduces the possibility of producing scratches in the disc which would adversely affect the recording operation. In addition, the scratches, to the extent that they are formed on the disc, are produced in a relatively controlled pattern.

Briefly stated, the invention includes a supporting structure, mounting means for mounting the disc on the supporting structure with the faces thereof at least substantially exposed, and abrasive means engageable simultaneously with both faces of the disc. The abrasive means is moved relative to the faces of the disc to cause the abrasive means to simultaneously remove a finite layer of the recording material from each of the faces of the disc. Thus, both faces of the disc are rapidly and simultaneously finished.

In the preferred form of the invention, the disc is rotated about the central axis thereof, while the abrasive means or abrasive members are reciprocated generally radially of the disc. To limit the radial extent of any of the scratches in the faces of the disc, it is preferred to reciprocate the abrasive members a plurality of times through short strokes as the disc rotates. By way of illustration, it has been found desirable to rotate the disc through about 50 revolutions while moving the abrasive members through about 1000 complete cycles, i.e., 2000 separate strokes, where one cycle consists of one inward stroke and one outward stroke. This very substantially limits the radial extent of the scratches. It also assures that the overlapping or criss-crossing of scratches will be held to a minimum. The result is the production of memory discs having an improved noise level and fewer blanked out areas on which no information can be recorded.

It is preferred to rotate the disc about a generally horizontal axis and to move the abrasive members in a horizontal plane which is perpendicular to the plane of the disc. The abrasive members are preferably retractable from the faces of the memory disc by double-acting pneumatic cylinders. The double-acting pneumatic cylinders are supported on conventional air-driven oscillators.

More particularly, the invention includes a housing having a finishing chamber and an equipment chamber therein with the disc and abrasive members being suitably supported within the finishing chamber. An automatically operated door is operable to provide access to the interior of the finishing chamber to permit manual placement and withdrawal of the disc in to the finishing chamber. To facilitate abrasive removal of the recording material, lubricant nozzles are provided for directing a stream of a suitable lubricant against the faces of the disc during the finishing operation. When the abrasive cycle is complete, a drying cycle is initiated during which a drying fluid, such as air, is directed into the finishing chamber and against the faces of the disc to hasten drying of the lubricant. This further reduces the overall cycle time.

The disc is mounted within the finishing chamber on a rotatably mounted support member. A rotatable clamping member is movable by an air cylinder into engagement with an annular portion of the disc adjacent the inner peripheral edge thereof to firmly clamp the disc against the support member for rotation therewith.

A lubricant reservoir is provided within the equipment chamber and supply and return conduit means interconnect the reservoir with the lubricant nozzles and the finishing chamber, respectively. The lubricant flows from the finishing chamber to the reservoir by gravity where it is filtered and then recycled to the lubricant nozzles. The equipment chamber also contains a drive motor for rotating the disc.

In one preferred form each of the abrasive members includes a honing stone which is clamped in position adjacent a face of the disc. In another preferred form, the abrasive means includes flexible abrasive means mounted adjacent the faces of the disc. The flexible abrasive means may include a roll of abrasive tape, such as Mylar tape.

Another feature of this invention is that when one portion of the abrasive means becomes worn, an unworn portion may be indexed into position adjacent the face of the disc. This feature of the invention can best be illustrated with reference to the flexible abrasive means. The flexible abrasive is wound at one end on a rotatable storage spool and at the other end on a rotatable take-up reel. The flexible abrasive passes over a rotatable support member which is intermediate the storage spool and take-up reel. The support member urges a portion of the flexible abrasive into engagement with one face of the disc. A similar unit may be provided for the opposite face of the disc. When the flexible abrasive becomes worn, the take-up reel is rotated a predetermined amount to cause a second portion of the flexible abrasive to overlie the support member and be in position to engage the disc. Thus, the second portion of the abrasive material can be used to finish the disc.

The indexing of the flexible abrasive is preferably accomplished automatically in response to the retraction of the abrasive material from the face of the disc. Such retraction will occur at the completion of each abrasive cycle.

One suitable arrangement for accomplishing this function includes a rotatable ratchet rigidly secured to the take-up reel and a pawl rigidly secured to the housing and engageable with the ratchet wheel as the latter is retracted from the disc at the completion of the abrasive cycle. The pawl moves the ratchet wheel a predetermined amount to cause a second portion of the flexible abrasive material to overlie the support member so that when the abrasive means is again moved toward the disc, the second portion thereof will engage the disc.

All functions of the finishing machine of this invention are accomplished automatically, except that the disc must be manually placed and removed from the finishing chamber. Means are provided for manually controlling the device. However, manual control is normally only used during setup. The machine cycle time for finishing both sides of the disc is approximately one minute and 45 seconds.

The invention, both as to its organization and method of operation, together with further features and advantages thereof, may best be understood by reference to the following description taken in connection with the accompanying illustrative drawings, in which.

Figure 1:
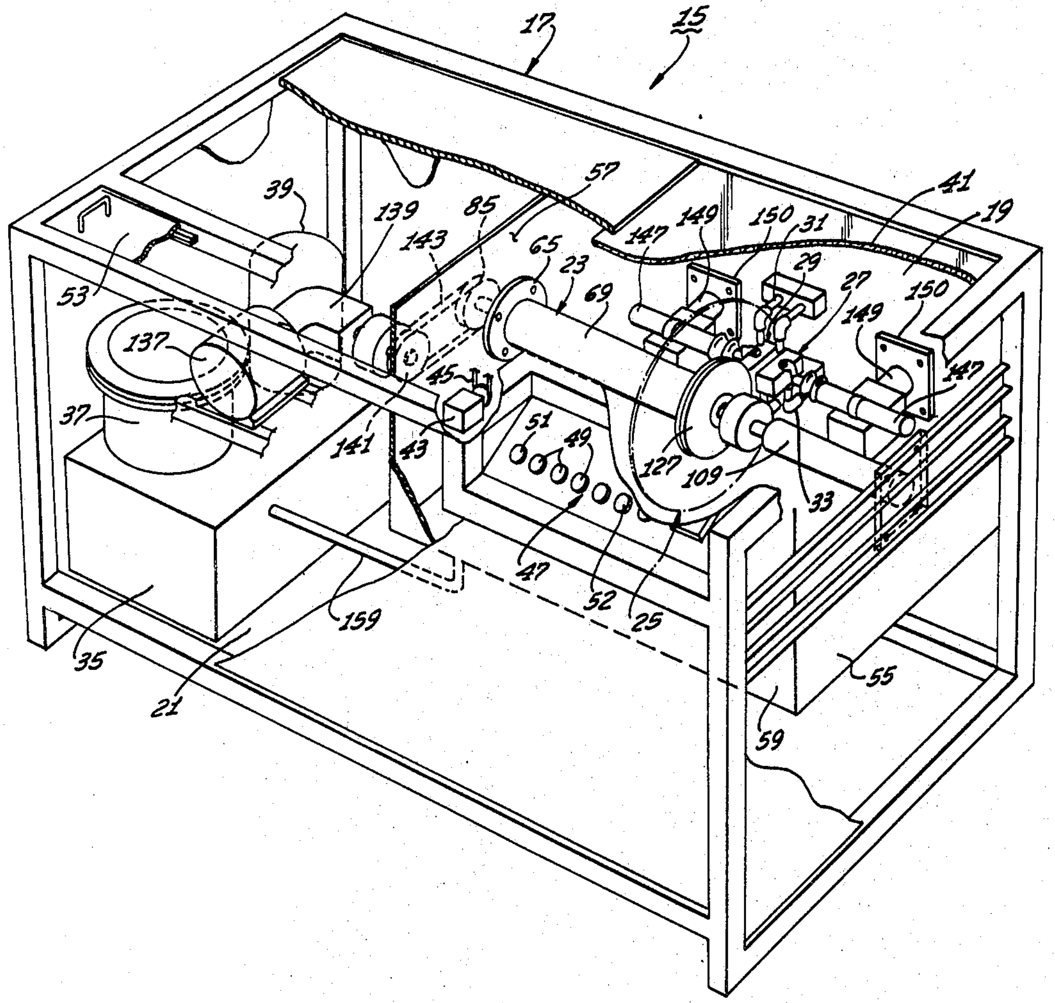
FIG. 1 is a perspective view of the finishing machine with portions thereof being broken away to expose the interior of the machine.

Referring to the drawings and in particular to FIGS. 1–4 thereof, reference numeral 15 designates a finishing machine constructed in accordance with the teachings of this invention. Generally, the finishing machine includes a housing 17 having a finished chamber 19 and an equipment chamber 21 therein. The finishing chamber 19 contains mounting means 23 for mounting a memory disc 25 for rotation about the central axis thereof. Two abrasive members 27 and 29 are provided adjacent the disc 25 for finishing the faces thereof. A pair of downwardly directed lubricant nozzles 31 direct a lubricant against the disc 25 and a pair of upwardly directed drying nozzles 33 direct streams of a drying fluid against the disc 25 during the drying portion of the cycle.

The equipment chamber 21 contains a lubricant reservoir 35 and a pump 37 for pumping the lubricant from the reservoir to the lubricant nozzles 31. A filter 39 is provided in the equipment chamber 21 to filter the lubricant to permit recycling thereof.

More particularly, the housing 17 includes a door 41 in the upper side thereof for providing access to the interior of the finishing chamber 19. The door 41 is preferably constructed of a transparent material, such as glass, and is movable in the plane of the upper side of the housing 17 to provide access to the interior thereof. A cover drive motor 43 and a belt drive 45 (FIGS. 1–3) are provided to automatically power the door 41 between an open position in which access is provided to the interior of the housing 17 and a closed position in which the door tightly seals the finishing chamber 19. Although various mechanisms may be employed to automatically open and close the door 41, it is preferred to utilize the rack and pinion arrangement described and claimed in common assignee's copending patent application entitled "Apparatus for and Method of Cleaning Memory Discs," Ser. No. 559,611, filed June 22, 1966.

A control panel 47 is disposed at an angle at the upper forward corner of the housing 17 as shown in FIG. 1. The control panel 47 has a plurality of indicator lights 49, an automatic start button 51, and a stop button 52. The indicator lights 49 designate which portion of the automatic cycle of the finishing machine is being performed and the automatic start and stop buttons 51 and 52 are utilized to initiate and stop automatic operation of the finishing machine, respectively. A removable cover 53 is located at the left end of the top surface of the housing 17 adjacent the forward corner thereof (FIG. 1). Removal of the cover 53 provides access to a series of buttons (not shown) which permit manual control of the finishing machine 15. The cover 53 is normally locked in position after start-up as the manual control buttons are normally only used during setup of the machine.

With further reference to FIGS. 1–4, the finishing chamber 19 has opposed end walls 55 and 57, a front wall 59, a rear wall 61, and a bottom wall 63. The walls of the finishing chamber define a generally rectangular structure having an open upper end which is closable by the door 41. As best seen in FIG. 1, the equipment chamber 21 takes up a major portion of the volume enclosed by the housing 17.

Figure 5:
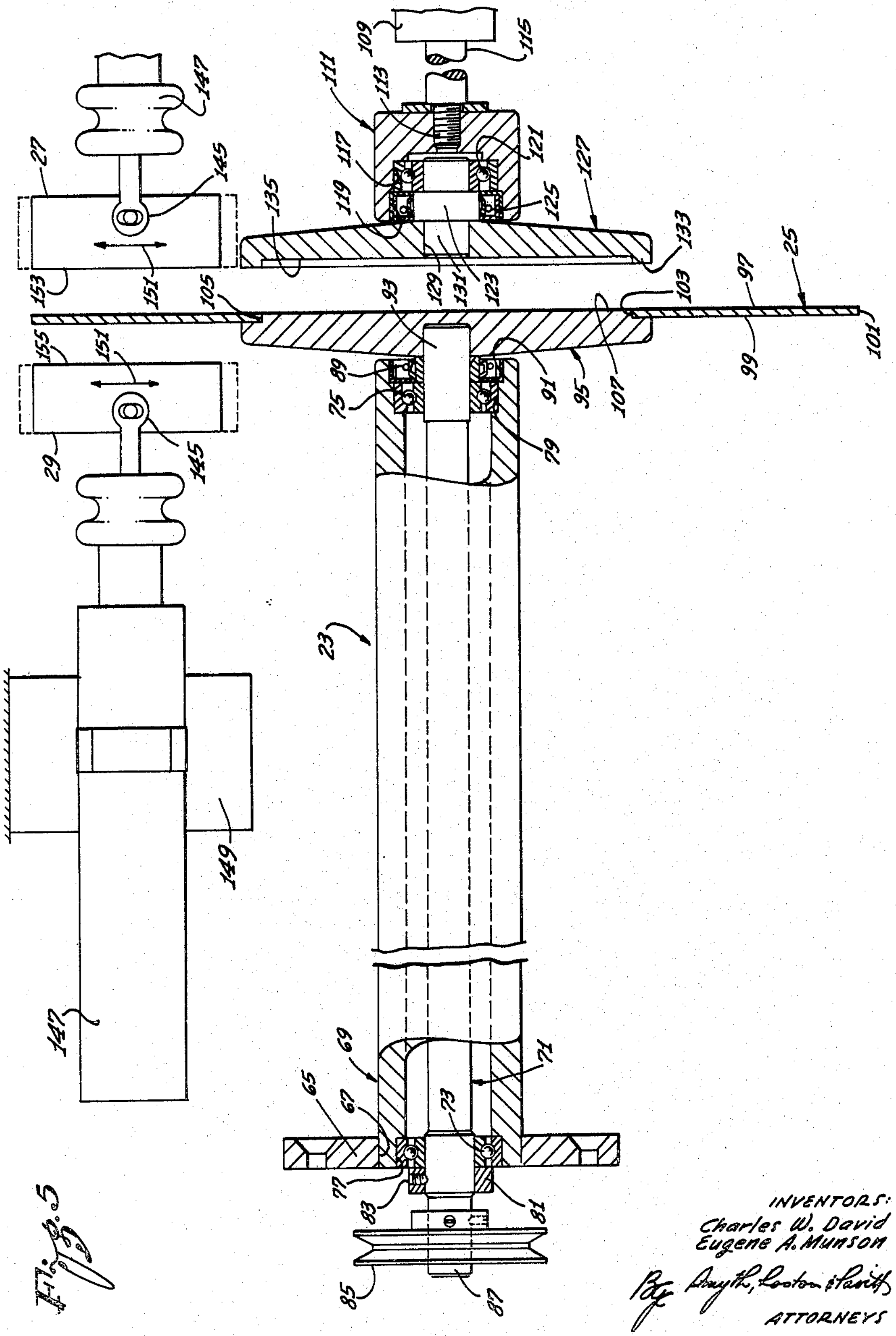
FIG. 5 is an enlarged view partially in section of the abrasive members and the mounting means for the disc.

The mounting means 23 is shown generally in FIGS. 1–4 and the details thereof can best be seen with reference to FIG. 5. The mounting means 23 includes a base plate 65 which is suitably secured to the end wall 57 of the finishing chamber 19 as by a plurality of bolts. The base plate 65 has a central aperture 67 therein in which an elongated sleeve 69 is secured, as by welding. A drive shaft 71 is rotatably mounted by a pair of bearings 73 and 75 which are secured in counterbores 77 and 79, respectively, of the sleeve 69. The drive shaft 71 is retained within the sleeve 69 by a collar 81 secured to the drive shaft by a set screw 83. A pulley 85 is suitably mounted on a projecting end portion 87 of the drive shaft 71. The opposite end of the sleeve 69 is sealed by a shaft seal 89 which is provided in a counterbore 91.

The drive shaft 71 has a mounting portion 93 extending axially beyond the end of the sleeve 69. A disc support member 95 is suitably secured to the mounting portion 93 of the drive shaft 71 for rotation therewith.

The support member 95 supports the disc 25. As clearly shown in FIG. 5, the disc 25 is an annular circular member having a circular opening extending axially therethrough. The disc 25 has opposed faces 97 and 99, an outer peripheral edge 101, and an inner peripheral edge 103. The faces 97 and 99 of the disc 25 are coated with a layer of recording material (not shown), such as a magnetic oxide dispersion. It is this recording material that the present invention is designed to finish or make into a surface suitable for recording purposes.

The support member 95 has an annular shoulder 105 on which the inner peripheral edge 103 of the disc 25 rests. The support member 95 has an outwardly directed planar end wall 107.

The mounting means 23 also includes a pneumatic cylinder 109 which is suitably secured to the end wall 55 of the finishing chamber 19. A cup-shaped member 111 is secured by screw threads 113 to an actuator shaft 115 which is drivable axially by the pneumatic cylinder 109. The cup-shaped member 111 has an axial bore 117 and an axial counterbore 119 opening inwardly toward the support member 95. A bearing 121 is suitably secured within the bore 117 and mounts a stub shaft 123 for rotation. A stub shaft seal 125 is retained in the counterbore 119.

A clamping member 127 having an axial opening 129 therethrough is supported on an end portion 131 of the stub shaft 123. Thus, the clamping member 127 is rotatable with the stub shaft 123. The clamping member 127 has an annular peripheral clamping portion 133 which is engageable with an annular portion of the disc 25 adjacent the inner peripheral edge 103 thereof to clamp the latter firmly against the shoulder 105 of the support member 95. The clamping member 127 also has a cylindrical recess 135 facing the end wall 107 of the support member 95.

The pneumatic cylinder 109 is operable to move the clamping member 127 axially toward and away from the support member 95 to clamp or release the disc 25. The support member 95, the disc 25, and the clamping member 127 are rotatable together. The rotational axis of the disc 25 is preferably horizontal and coincides with the central axis thereof.

Drive means (FIGS. 1–3) are provided for rotating the disc 25. Such means includes an electric motor 137, a clutch 139, a drive pulley 141, a belt 143, and the pulley 85. The motor 137 is suitably supported within the equipment chamber and causes the disc 25 to rotate at a predetermined speed. If desired, a suitable gear reduction unit may be employed.

Figure 2:
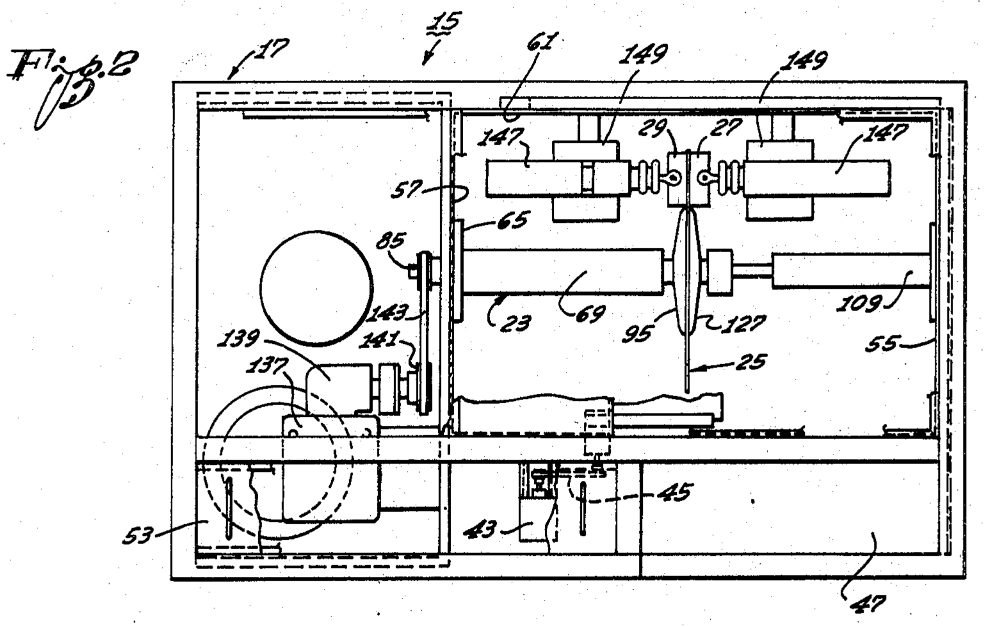
FIG. 2 is a somewhat simplified top plan view of the finishing machine with portions thereof broken away to expose the interior of the machine.
Figure 3:
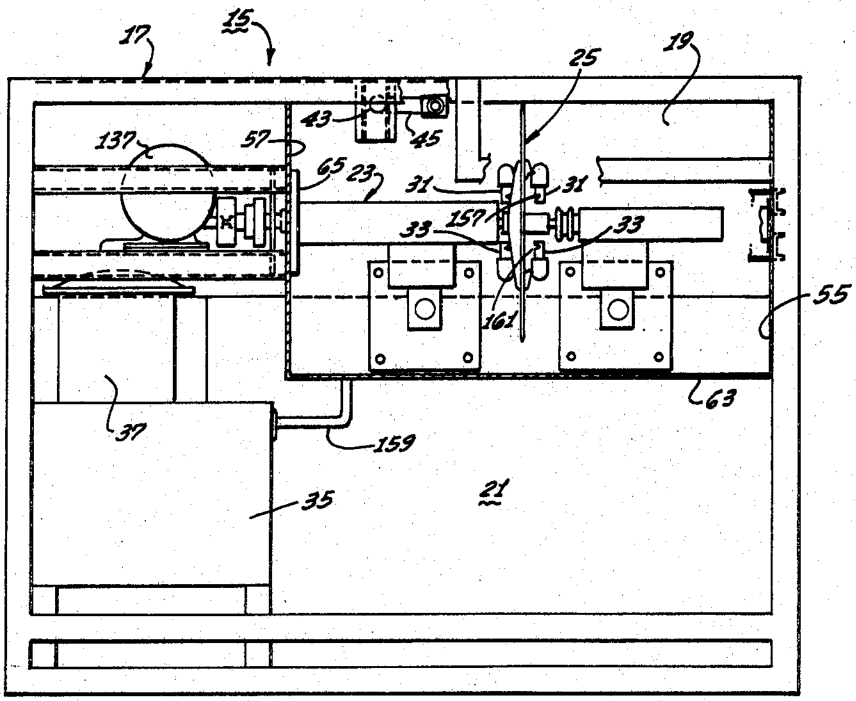
FIG. 3 is a front elevational view of the finishing machine with portions thereof broken away.
Figure 4:
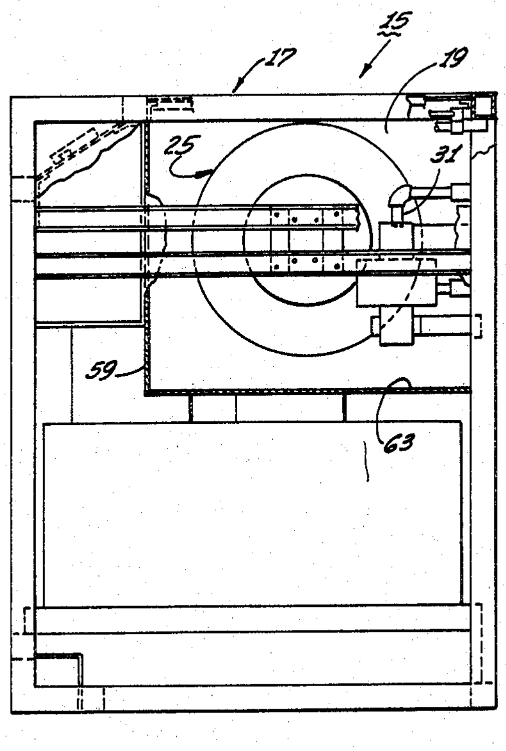
FIG. 4 is an end elevational view of the finishing machine with portions thereof broken away.

As shown generally in FIGS. 1 and 2 and more specifically in FIG. 5, the abrasive members 27 and 29 confront and are engageable with the faces 97 and 99, respectively, of the disc 25. In the embodiment illustrated in FIGS. 1–5, the abrasive members 27 and 29 are in the form of honing stones. Each of the abrasive members 27 and 29 are mounted by a clamping device 145 which is described more specifically hereinafter in connection with FIGS. 6–11. Each of the clamping devices 145 are suitably secured to a double-acting pneumatic cylinder 147. The pneumatic cylinders are of a conventional type and are suitably connected to a pneumatic control system (not shown) to cause the abrasive members 27 and 29 to be extended into engagement with the faces 97 and 99, respectively, of the disc or retracted out of engagement therewith.

Each of the pneumatic cylinders 147 is suitably mounted on a conventional air-driven oscillator 149. The oscillators 149 are secured to mounting plates 150 (FIG. 1) which are fixed to the rear wall 61 of the finishing chamber 19. The oscillators 149 are also suitably connected to a control system which causes operation of the oscillator. The oscillators 149 cause movement of the abrasive members 27 and 29 generally radially inwardly and outwardly along the faces of the disc through a plurality of cycles, as indicated by the arrows 151 in FIG. 5. Preferably, the abrasive members 27 and 29 oscillate in a horizontal plane which is perpendicular to the plane of the disc 25. The abrasive members 27 and 29 have surfaces 153 and 155, respectively, that engage the faces of the disc. The surfaces 153 and 155 are preferably quite long and extend over substantially the entire radial width of the exposed portions of the faces of the disc. The strokes of the abrasive members 27 and 29 are preferably quite short as shown schematically by the dashed lines in FIG. 5.

It has been found that rotating the disc approximately 50 times per minute while oscillating the abrasive members 27 and 29 through 1000 cycles or 2000 strokes per minute produces good results. The scratches produced in the faces 97 and 99 of the disc 25 then extend radially of the disc a very limited amount. This high speed reciprocation permits the use of fine abrasive members 27 and 29 and decreases the time required for the finishing operation. The abrasive members 27 and 29 operate simultaneously to remove a finite layer of the recording material from the faces of the disc.

During the finishing operation, a lubricant is supplied from the lubricant reservoir 35 by the pump 37 through a supply conduit (not shown) to lubricant nozzles 31. Each of the lubricant nozzles 31 has a laterally directed discharge port 157 (FIG. 3) which directs the lubricant laterally against the face of the disc 25 which confronts such nozzle. The lubricant flows downwardly on the disc and assists in the even removal of a layer of the recording material. The lubricant then falls to the bottom wall 63 of the finishing chamber 19 and flows by gravity to a return conduit 159 which returns the lubricant to the lubricant reservoir 35. To permit recycling of the lubricant to the nozzles 31, the filter 39 is provided to filter out any impurities which may be returned therewith to the reservoir 35.

Each of the drying nozzles also has laterally directed discharge ports 161 (FIG. 3) which direct a drying fluid, such as air, against the face of the disc which confronts such nozzle. The drying fluid normally will flow through the drying nozzles 33 during the drying cycle which begins at about the time when the flow of lubricant to the lubricant nozzles 31 is halted.

The operation of the device is as follows. Initially, the door 41 is open to provide access to the interior of the finishing chamber 19 and the clamping member 127 is retracted a predetermined amount from the support member 95. Similarly, the abrasive members 27 and 29 are in their retracted positions to facilitate manual positioning of the disc 25 on the disc support member 95. Thus, the machine is prepared for the operator to manually position the disc 25 on the support member 95.

The operator then depresses the automatic start button 51 and the cover drive motor 43 automatically begins to move the door 41 to the closed position. Simultaneously, the pneumatic air cylinder 109 is actuated to move the clamping member 127 toward the support member 95 to firmly clamp the disc 25 thereagainst. When the disc is clamped in position, the abrasive members 27 and 29 are extended into contact with the faces 97 and 99, respectively, of the disc; and when the abrasive members are in contact with the disc, the clutch 139 is engaged to cause the motor 137 to begin rotating the disc. The lubricant begins flowing before the disc 25 begins rotating to assure that the disc will be wet with solvent when the abrasive action commences. The oscillators begin reciprocation of the abrasive members simultaneously with the beginning of the rotation of the disc 25. After a predetermined period of time, the oscillators stop and the abrasive members are retracted. Lubricant flow continues for a short time to rinse the disc. Lubricant flow then stops and the flow of drying fluid begins. The drying fluid blows and evaporates the lubricant from the disc. The disc continues to rotate during the drying cycle to further assist in the drying thereof. Upon completion of the drying cycle, the air flow stops and the cover begins to open. Last, the clamping member 127 is retracted by the pneumatic cylinder 109 to allow removal of the disc 25 from the finishing chamber 19.

FIGS. 6–9 show an alternate construction in which flexible abrasive members 163 and 165 are utilized. Each of the flexible abrasive members 163 and 165 are supported by identical support means 167 which are retained in the clamping devices 145. The clamping devices 145 are secured to the pneumatic cylinders 147 and all other portions of the embodiment of FIGS. 6–9 are identical to the embodiment shown in FIGS. 1–5.

Figures 6, 7:
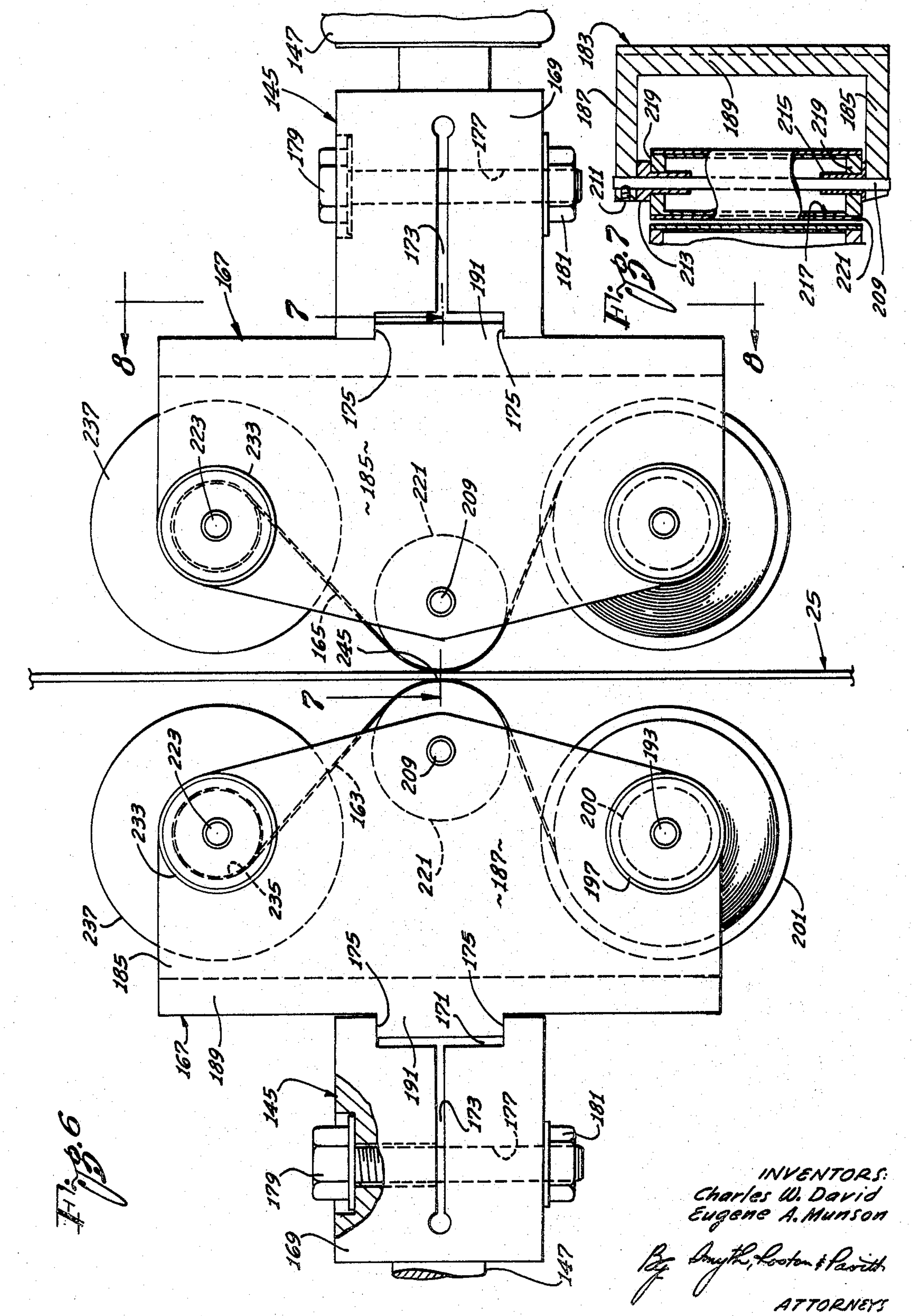
FIG. 6 is an enlarged front elevational view of the flexible abrasive and the support means therefor.
FIG. 7 is a sectional view on a reduced scale taken along line 7—7 of FIG. 6.

As clearly shown in FIG. 6, each of the clamping devices 145 includes a body 169 having a recess 171 formed in one side thereof and a slot 173 extending from the recess substantially through the body 169. The recess 171 has opposed jaws 175. The body 169 has a passageway 177 extending therethrough transverse to the slot 173. A bolt 179 extends through the passageway 177 and is retained therein by a nut 181. By tightening of the nut 181, the jaws 175 are forced resiliently toward each other as permitted by the slot 173 to securely clamp the support means 167. Various other types of clamping members may be used.

The support means 167 includes a generally channel-shaped body member 183 (FIG. 7) having opposed parallel flanges 185 and 187 interconnected by a web 189. The web 189 has a tongue portion 191 which is receivable within the recess 171 and is clamped therein by the jaws 175. Thus, the support means is mounted for movement toward and away from the disc in the same manner as the abrasive members 27 and 29.

A lower shaft 193 (FIG. 8) extends between the flanges 185 and 187 and is rotatably mounted thereby. The lower shaft 193 is supported by a sleeve bearing 195 in the flange 187 and is retained in the body member 183 by a pair of collars 197 and 199.

A tubular storage spool 200 is mounted on the shaft 193 for rotational movement therewith. The storage spool 200 is spaced from the interior surface of the flange 187 by a relatively large diameter collar 201 which is secured to the shaft 193 by a set screw 203. A pin 205 is fixed to the storage spool 200 and engages a recess 207 in the collar 201 to cause the spool to rotate with the collar 201 and the shaft 193.

The flexible abrasive member 163 is wound on the storage spool 200. The flexible abrasive member 163 may be a sheet of abrasive tape, such as Mylar tape.

The flanges 185 and 187 project outwardly intermediate their upper and lower edges and are apertured as shown in FIG. 7 to rigidly support a shaft 209 which is fixed to the flange 187 by a set screw 211. A pair of sleeve bearings 213 and 215 are mounted at opposite ends of the shaft 209 adjacent the flanges 185 and 187, respectively. A hollow cylindrical member 217 having apertured end portions 219 is rotatably mounted on the bearings 213 and 215. A tubular platen 221 fits over the cylindrical member 217 and is suitably secured thereto. The flexible abrasive member 163 passes over the platen 221 as it extends upwardly. As best seen in FIG. 6, the platen 221 causes the flexible abrasive 163 to protrude toward the face of the disc. Thus, it is the platen 221 which supports thhe portion of the flexible abrasive member 163 which is in abrasive contact with the face of the disc.

Figures 8, 9:
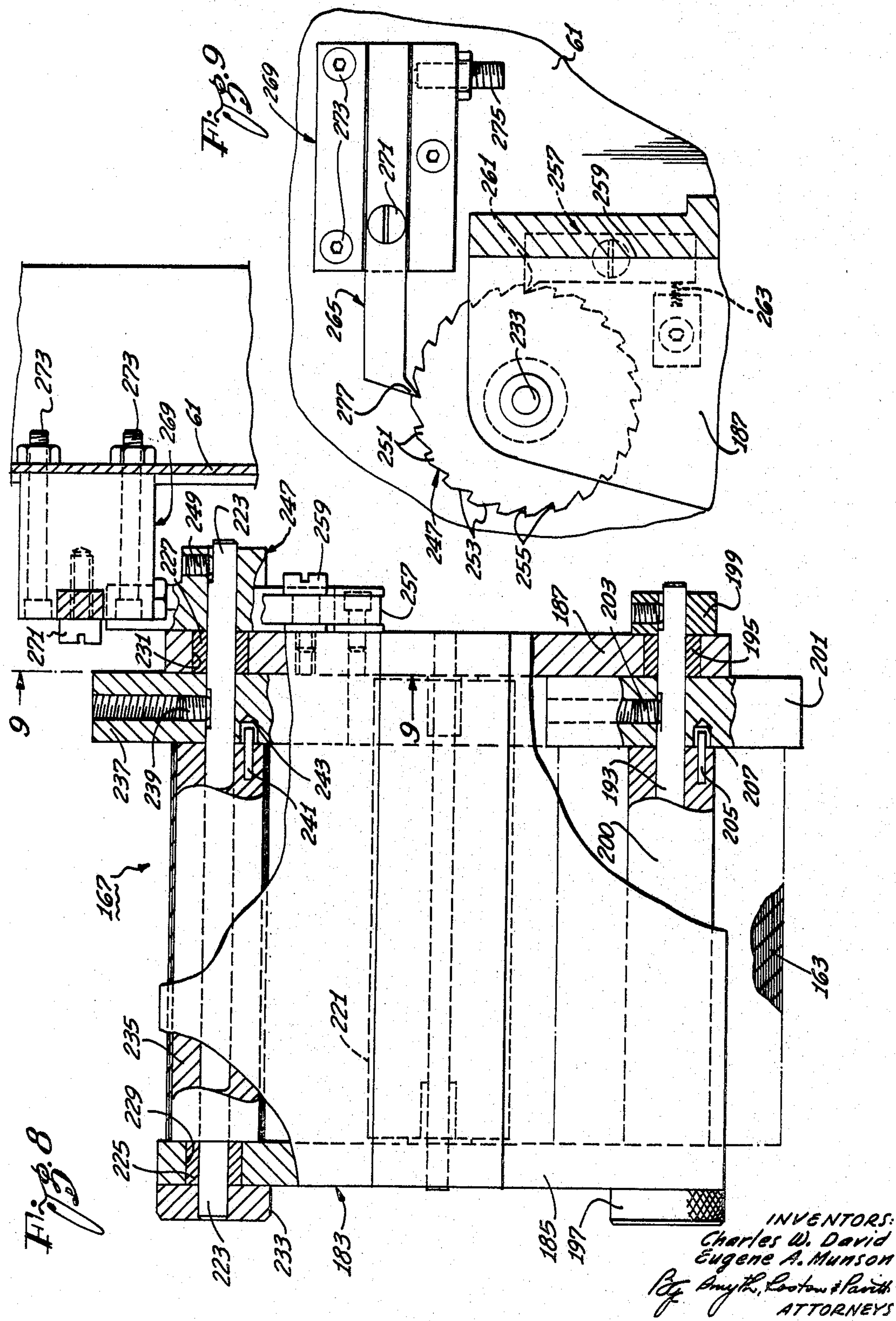
FIG. 8 is an end elevational view partially in section taken along line 8—8 of FIG. 6 and showing one of the support means for the flexible abrasive and the pawl for indexing the flexible abrasive.
FIG. 9 is a fragmentary sectional view taken along line 9—9 of FIG. 8 and showing the ratchet and pawl for indexing the flexible abrasive.

As shown in FIGS. 6 and 8, an upper shaft 223 is mounted by a pair of bearings 225 and 227 which are fixed in apertures 229 and 231, respectively, in the flanges 185 and 187. The shaft 223 is retained within the bearings 225 and 227 by a collar 233 which is secured to the outer end thereof adjacent the flange 185. A tubular take-up drum 235 is mounted on the shaft 223. The take-up drum 235 is spaced from the flange 187 by a large diameter collar 237 which is fixed to the shaft 223 by a set screw 239. A pin 241 is rigidly affixed to an end portion of the drum 235 and is received within a recess 243 in the collar 237. Thus, the take-up drum 235, the collar 237, and the shaft 223 are rotatable as a unit.

The flexible abrasive member 163 extends upwardly over the platen 221 and is wound on the take-up drum 235. With the abrasive member 163 positioned as shown in FIG. 6, a first portion 245 thereof is in engagement with the face 99 of the disc 25. When the first portion 245 has become worn to the point where it is no longer useful in finishing the disc, the take-up drum 235 can be rotated to move the first portion 245 upwardly toward the take-up drum to thereby position a second portion of unworn abrasive material in a position where it confronts and is engageable with the face 99. Thus, as the abrasive becomes worn or otherwise unsuitable for the finishing operation, it can be quickly and easily replaced by new abrasive material.

Preferably, the abrasive member 163 is indexed automatically. This can conveniently be accomplished during the movement of the support means 167 away from the disc 25. As indicated above, this will occur at the completion of the abrasive cycle of the finishing operation for each disc that is finished by the machine.

A preferred form for indexing the flexible abrasive members 163 and 165 is illustrated in FIGS. 8 and 9. This structure includes a ratchet wheel 247 secured to the shaft 223 closely adjacent the outer surface of the flange 187 by a set screw 249. As shown in FIG. 9, the ratchet wheel 247 has a plurality of teeth 251 projecting generally radially outwardly therefrom. Each of the teeth 251 has a sloping surface 253 which intersects a radially extending surface 255 of the adjacent tooth to form a shoulder. The ratchet wheel 247 is thus designed for counterclockwise rotation as viewed in FIG. 9.

To prevent clockwise rotation of the ratchet wheel 247 as viewed in FIG. 9, a member 257 is pivotally secured adjacent its midpoint to the flange 187 by a screw 259. The member 257 has a projection 261 which is engageable with the radially extending surfaces 255 of the teeth 251 to prevent clockwise rotation of the ratchet wheel 247. The projection 261 is biased inwardly toward the center of the ratchet wheel 247 by a spring 263 which engages the opposite end of the member 257.

To impart counterclockwise rotation to the ratchet wheel, a pawl 265 is secured in a longitudinal channel 267 of a mounting bracket 269 by a screw 271. The mounting bracket 269 is secured by a plurality of bolts 273 to the rear wall 61 of the finishing chamber 19. The screw 271 mounts the pawl 265 for limited pivotal movement within the channel 267. A threaded member 275 is adjustable within the bracket 269 to further limit pivotal movement of the pawl 265. The pawl 265 has a finger 277 that is engageable with one of the teeth 251 upon the retraction of the support means 167.

In operation of the embodiment of FIGS. 6–9, initially the first portion 245 of the abrasive member 163 will engage and abrasively remove recording material from the face of the disc 25. At the completion of the abrasive portion of the finishing cycle, the support means 167 is retracted by the pneumatic cylinder 147 so that the abrasive member no longer engages the disc 25. As the support means 167 nears the end of its retracting stroke, the finger 277 of the pawl 265 engages one of the shoulders formed by the intersection of one of the sloping surfaces 253 with the adjacent radially extending surfaces 255. As the support means 167 completes its retracting stroke, the rigidly mounted pawl 265 rotates the ratchet wheel 247 counterclockwise as viewed in FIG. 9. As the ratchet wheel 247 is secured to the shaft 233, the rotational movement thereof is transmitted to the shaft 233, which in turn causes a corresponding amount of rotation of the take-up drum 235. Rotation of the take-up drum 235 unwinds the sheet-like abrasive member 163 from the storage spool 200 which is freely rotatable with the lower shaft 193. This moves the first portion 265 which had been overlying the platen 221 out of a portion in which it is engageable with the discs A second portion of the flexible abrasive member 163 is, therefore, positioned in overlying relationship with the platen 221 so that upon the return stroke, i.e., movement of the support means toward the disc 25, this new and unused portion of the flexible abrasive member will be in abrasive contact with the disc. Thus, the embodiment of FIGS. 6–9 provides efficient means for replacing the worn abrasive material. Of course, a considerable length of the abrasive member 163 may be initially wound on the storage spool 200 so that the spools need not be frequently changed.

Figure 10:
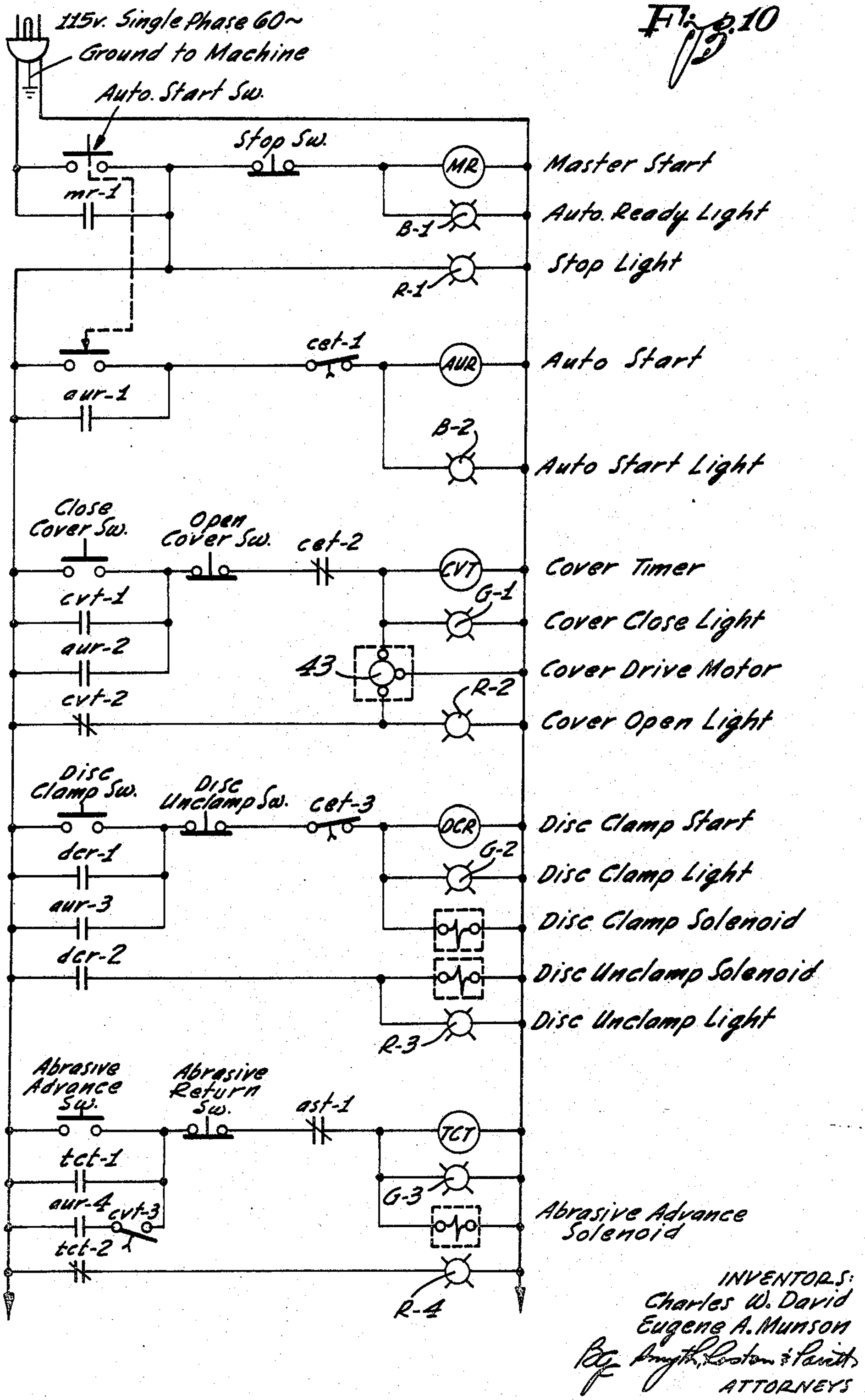
FIGS. 10 and 11 are schematic wiring diagrams of a preferred form of electrical controls for the finishing machine.
Figure 11:
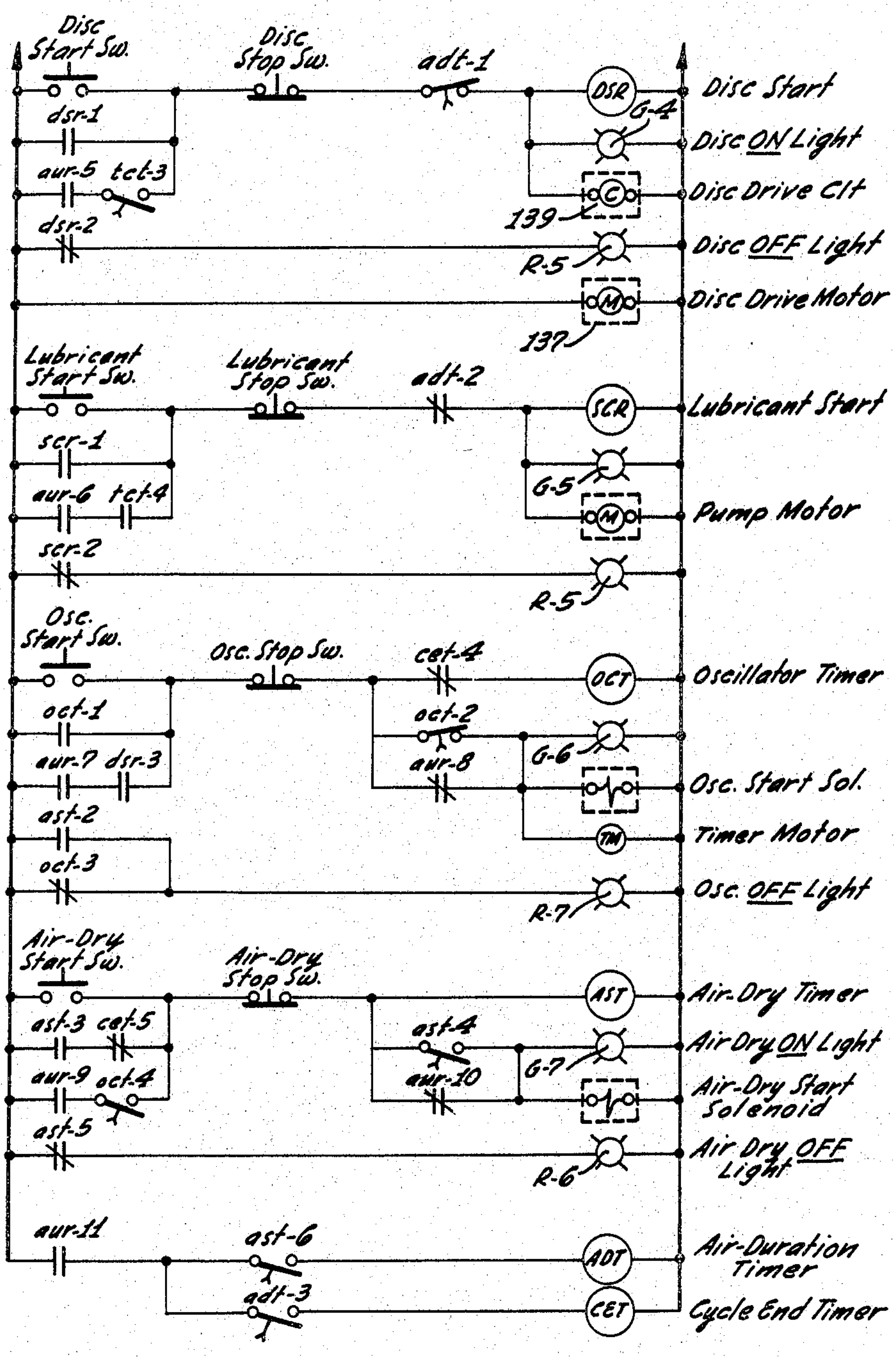

By way of illustration, the electrical controls illustrated diagrammatically in FIGS. 10 and 11 may be utilized to cause the finishing apparatus 11 to function in the manner described above. The various relays in FIGS. 10 and 11 are illustrated in their de-energized condition.

As shown in FIG. 10, closing of the automatic start switch energizes a master start relay MR and an automatic ready light B–1 through a normally closed manually operated stop switch. The stop switch provides for manual de-energizing of the relay MR. Energization of the master start relay MR closes the normally open contacts *mr*–1 to provide a holding circuit for the relay MR and to energize a stop light R–1 which is one of the indicator lights 49 on the control panel 47 (FIG. 1), as are all of the lights shown in FIGS. 10 and 11. Manual closing of the automatic start switch also energizes an automatic start relay AUR and an automatic start light B–2 through normally closed contracts *cet*–1 of a cycle end timer CET (FIG. 11). Closure of the normally open contacts *aur*–1 provides a holding circuit for the relay AUR.

Normally, the cover drive motor 43 is energized through contacts *cvt*–2 to keep the door 41 open. Closure of the normally open contacts *aur*–2 energizes a cover timer CVT and an indicator light G–1, and reverses the cover drive motor 43 through an open cover switch and a pair of normally closed contacts *cet*–2. The manually operated open cover switch and a close cover switch provide means for manually operating the cover drive motor 43. A holding circuit for the cover timer CVT and the cover drive motor 43 is provided through a pair of normally open contacts *cvt*–1. The cover open light R–2 is on when the timer CVT is de-energized. Energization of the motor 43 through the contacts *cet*–2 causes the door 41 to close.

Similarly, closure of the normally open contacts *aur*–3 energizes a disc clamp start relay DCR, a disc clamp light G–2 and a disc clamp solenoid through a normally closed disc unclamp switch and a normally closed pair of contacts *cet*–3. The disc unclamp switch and a disc clamp switch allow the manual operation of the disc clamp solenoid. A pair of normally open contacts *dcr*–1 close with the energization of the relay DCR to provide a holding circuit for the disc clamp start relay DCR. Simultaneously, a pair of normally closed contacts *dcr*–2 open to de-energize a disc unclamp solenoid and a disc unclamp light R–3. With the disc unclamp solenoid energized, the cylinder 109 holds the clamping member 127 out of engagement with the disc to allow removal thereof from the support member 95. Energization of the disc clamp solenoid causes fluid to be admitted to the cylinder 109 to cause the clamping member 127 to advance into engagement with the inner periphery of the disc 25.

A timer TCT, a light G–3, and an abrasive advance solenoid are energized through the contacts *aur*–4, contacts *cvt*–3, a manually operable abrasive return switch, and contacts *ast*–1. The advance solenoid may actuate a valve or other suitable means to provide fluid under pressure to the cylinder 147 to cause the abrasive members 27 and 29 to advance toward the disc 25. The contacts *cvt*–3 provide a delayed closure of this circuit to assure that the abrasive members 27 and 29 will not engage the disc 25 prior to the time that the disc is securely clamped in place by the clamping member 127. The normally closed contacts *tct*–2 are opened by the energization of the timer TCT to turn off the light R–4.

Referring to FIG. 11, the disc drive motor 137 is started as soon as the automatic start switch is closed. However, the clutch 139 is disengaged at the time to prevent rotation of the disc 25. A disc start relay DSR, a disc on light G–4, and the disc drive clutch 139 are energized through normally open contacts *aur*–5 and *tct*–3, a disc stop switch, and normally closed contacts *adt*–1. The closure of the contacts *tct*–3 is delayed slightly following the energization of the relay TCT so that the clutch 139 is engaged after the cylinders 109 have moved the abrasive members into engagement with the disc.

Contacts *dsr*–1 provide a holding circuit for the disc start relay DSR and a manually operable disc start switch and the disc stop switch provide for manual operation of the clutch 139. The contacts *dsr*–2 open to de-energize a disc off light R–5.

A lubricant start relay SCR, an indicator light G–5, and a pump motor for the pump 37 are energized through contacts *aur*–6, *tct*–4, and *adt*–2, and a lubricant stop switch. Because the contacts *tct*–3 delay the beginning of disc rotation, the pump 37 will have been started, and if a sufficient period of delay is provided, lubricant will be flowing through the nozzles 31 onto the disc before the disc begins rotating. Contacts *scr*–1 provide a holding circuit for the relay SCR, and a lubricant start switch and the lubricant stop switch provide for manual control of the pump motor. An indicator light R–5 is turned off by the contacts *scr*–2 upon energization of the relay SCR.

Closure of contacts *aur*–7 and *dsr*–3 energizes an oscillator timer OCT through normally closed contacts *cet*–4 and completes a circuit to a work in progress light G–6, an oscillator start solenoid, and a timer motor TM through a pair of normally closed contacts *oct*–2. The oscillator start solenoid actuates the oscillators 149 to initiate movement of the abrasive members. Normally closed contacts *aur*–8 also provide a connection to the light G–6, the oscillator start solenoid, and the timer motor TM. The contacts *aur*–8 have no effect on the automatic operation of the device, but permit manual operation independently of the oscillator timer OCT.

After a predetermined period during which the abrasive members 27 and 29 remove a layer of the recording material from the disc, the contacts *oct*–2 to de-energize the oscillator start solenoid to stop the oscillators 149. Next, the contacts *oct*–4 close to energize an air dry timer AST through contacts *aur*–9. This opens the contacts *ast*–1 to cause retraction of the abrasive members 27 and 29. After a predetermined delay period during which the disc is rinsed by the lubricant, the contacts *ast*–4 close to energize an air dry start solenoid which operates appropriate means, such as a valve, to supply air through the nozzles 33 to facilitate the drying of the disc. A holding circuit is provided through the contacts *ast*–3 and *cet*–5 and air dry start and stop switches provide for manual control of the timer AST. The contacts *aur*–10 have no effect on the automatic operation of the device but permit manual operation of the air dry start solenoid.

As indicated above, energization of the relay AST opens the normally closed contacts *ast*–1 to de-energize the abrasive advance solenoid to cause the abrasive members 27 and 29 to be retracted from the disc 25. Because of the delay provided in the closure of the contacts *ast*-4, the abrasive members are retracted prior to the time air begins flowing through the nozzles 33. The disc drive motor 131 continues to rotate the disc 31 and the contacts *ast*–5 open to extinguish an indicator light R–6.

After only a short period of delay provided for by the delayed closure of the contacts *ast*–6 an air duration timer ADT is energized through the contacts *aur*–11. This causes opening of the normally closed contacts *adt*–2 to de-energize the solvent pump motor to thereby stop the flow of solvent to the disc 31. This also occurs prior to or simultaneously with the beginning of the air flow to the disc, but after the abrasive members 27 and 29 have been retracted.

The drying cycle continues with air being directed against the disc 25 which is being rotated by the disc drive motor 137. After a predetermined delay period the normally closed contacts *adt*–1 open to de-energize the disc drive clutch to allow the disc 25 to stop rotating.

Next, the normally open contacts *adt*–3 are closed to energize a cycle end timer CET. This causes the normally closed contacts *cet*–4 to open to de-energize the timer OCT. This in turn causes the contacts *oct*–4 to open to de-energize the air dry start solenoid to stop the flow of air to the disc.

After a short delay provided by the delayed opening of the contacts *cet*–3, the disc clamp solenoid is de-energized and the disc unclamp solenoid is energized to cause the clamping member 127 to be retracted from the disc 25. Energization of the cycle end timer CET also opens the contacts *cet*–2 to de-energize the cover timer CVT. This in turn causes the contacts *cvt*–2 to return to their normally closed position to reverse the potential across the motor 43 to cause the door 41 to be opened.

Finally, the contacts *cet*–1 open to de-energize the relay AUR. The master start relay MR is still energized through the holding circuit established by the contacts *mr*–1. Thus, the motor 43 is energized to maintain the door 41 in the open position and the disc unclamp solenoid is energized to maintain the clamping member 127 in the retracted position. The motor 137 remains energized. The cycle can be repeated by merely loading another disc into the finishing chamber 19 and pressing the automatic start switch. The motors 57, 81 and 151 are preferably of the conventional "dead stall" type so that they can remain energized against an immovable load without causing damage thereto.

It should be understood that other arrangements of controls for the cleaning apparatus may be employed. However, the control system illustrated in FIGS. 10 and 11 is preferred because it utilizes a minimum number of relays.

Although an exemplary embodiment of the invention has been shown and described, many changes, modifications, and substitutions may be made by one having ordinary skill in the art without necessarily departing from the spirit and scope of this invention.

What is claimed is:

1. In a method of finishing a memory disc with abrasive means wherein the disc has a face at least partially covered with recording material, the steps of:

supporting the disc for rotation with the face thereof at least substantially exposed;

supporting the abrasive means for movement radially of said face of the disc with the abrasive means being engageable with said face of the disc;

rotating the disc at a predetermined speed so that the disc rotates through one revolution in a given period of time; and rapidly moving said abrasive means generally radially, inwardly and outwardly along said face of the disc through many cycles in said given period of time while the disc is rotating and with the abrasive means in engagement therewith to remove a layer of the recording material from said face of the disc, each stroke of each cycle being relatively short so that the path of contact between said abrasive means and the disc extends substantially circumferentially and only slightly radially.

2. A method as defined in claim 1 wherein said disc is rotated through approximately 50 revolutions while the abrasive means is moved through about 2000 strokes.

3. A method as defined in claim 1 including the additional steps of:

directing a lubricant against the disc to facilitate removal of the layer of the recording material;

subsequently retracting the abrasive means out of engagement with said face of the disc;

stopping the flow of fluid against the disc; and directing a drying fluid against the disc following said step of stopping while the disc is rotating.

4. In a device for finishing a generally annular memory disc having opposed first and second faces at least partially covered with a recording material, a central axis, and inner and outer peripheries, the combination of:

a housing having wall means defining a finishing chamber and openable door means for providing access to said finishing chamber;

mounting means for mounting the disc for rotation about the central axis thereof within the finishing chamber with the faces of the disc at least substantially exposed, said mounting means including a support member and a clamping member movable toward and away from each other to tightly clamp therebetween a radially narrow region of the disc adjacent the inner periphery of the disc;

first and second abrasive means;

means for mounting said first and second abrasive means within said finishing chamber for movement into engagement with the first and second faces of the disc, respectively;

motor means drivingly connected to at least one of said members to rotate said member and the disc about the central axis thereof;

means for moving said abrasive means inwardly and outwardly generally radially of the disc while the disc is rotating to remove a layer of the recording material from each of the faces thereof;

means for retracting said first and second abrasive means out of engagement with the first and second faces, respectively; and nozzle means mounted within said finishing chamber for directing a lubricant against the disc.

5. A combination as defined in claim 4 including means for directing a drying fluid against the faces of the disc.

6. A combination as defined in claim 4 including an equipment chamber in said housing adjacent said finishing chamber, a lubricant reservoir in said equipment chamber, supply conduit means for supplying lubricant from said reservoir to said nozzle means, return conduit means for returning the lubricant from said finishing chamber to said reservoir, and filtering means for filtering the lubricant to allow the lubricant to be reused.

7. A combination as defined in claim 4 wherein said means for moving said abrasive means includes pneumatic oscillator means and said means for retracting includes fluid pressure responsive cylinder means, said oscillator means and said cylinder means being mounted in said finishing chamber.

8. A combination as defined in claim 4 wherein said means for mounting said first abrasive means includes a body member, a storage spool and a take up drum rotatably mounted on said body means and a holding member mounted on said body means, said abrasive means including an elongated flexible abrasive wound on said storage spool and extending over said holding means whereby said holding means holds a portion of the flexible abrasive against the first face of the disc.

9. In a device for finishing a generally annular memory disc having a face at least partially covered with a recording material, a central axis and inner and outer peripheries, the combination of:

a supporting structure;

means for mounting the disc on the supporting structure for rotation generally about the axis of the disc with the face thereof at least substantially exposed, said mounting means including clamping means clampingly engageable with an inner peripheral region of the disc;

a body member mounted on said supporting structure closely adjacent the disc;

a storage spool and a takeup reel rotatably mounted on said body member;

an elongated flexible abrasive wound on said storage spool and said take-up reel to permit transfer of the flexible abrasive between said spool and said reel;

means on said body member intermediate said storage spool and said take-up drum for holding a relatively narrow portion of the flexible abrasive intermediate said drum and said reel in abrasive engagement with the face of the disc, the other portions of said flexible abrasive being out of substantial abrasive contact with said face of the disc;

means for moving said body member with said storage spool, take up reel, holding means and flexible abrasive thereon generally toward the face of the disc to cause said portion of the abrasive to engage the face of the disc and for moving the abrasive out of contact with the face of the disc;

means for rotating the disc about said axis relative to said portion of the flexible abrasive;

means for moving said body member with said storage spool, take up reel, holding means and flexible abrasive thereon generally radially relative to the disc while the disc is rotating and with said abrasive in contact with the face of the disc; and means for moving said flexible abrasive from said storage spool to said take up reel.

10. A combination as defined in claim 9 wherein said means for moving said flexible abrasive from said storage spool to said take up reel includes means responsive to movement of said body member away from the face of the disc to rotate said take up drum and said storage reel to move a new region of the flexible abrasive over said holding means.

11. A combination as defined in claim 9 wherein said last mentioned means includes a ratchet wheel drivingly connected to said take up reel and a panel mounted on said supporting structure and engageable with the ratchet wheel upon movement of the body member away from the face of the disc to drive the take up reel.

12. A combination as defined in claim 9 wherein said face is relatively flat and said means for holding includes an arcuate surface engageable with the flexible abrasive to urge said portion of flexible abrasive into engagement with said face whereby the arcuate nature of said surface and the flatness of said face cause said portion to be relatively narrow.

References Cited

UNITED STATES PATENTS

| | | | |
|---|---|---|---|
| 1,536,928 | 5/1925 | Reitz | 51—67 |
| 2,258,733 | 10/1941 | Brackett | 51—62 |
| 3,045,399 | 7/1962 | Sloan | 51—267 X |
| 3,116,572 | 1/1964 | Dreiling | 51—67 |
| 3,333,366 | 8/1967 | Gzubak | 51—67 |
| 3,341,983 | 9/1967 | Baldenhofer | 51—267 |
| 1,909,155 | 5/1933 | Webster | 51—51 |
| 2,315,859 | 4/1943 | Indge | 51—67 |

FOREIGN PATENTS

| | | |
|---|---|---|
| 364,707 | 6/1906 | France. |
| 26,918 | 1/1933 | Netherlands. |

HAROLD D. WHITEHEAD, Primary Examiner

U.S. Cl. X.R.

51—67, 281

UNITED STATES PATENT OFFICE

CERTIFICATE OF CORRECTION

Patent No. 3,481,083 December 2, 1969

Charles W. David et al.

It is certified that error appears in the above identified patent and that said Letters Patent are hereby corrected as shown below:

In the heading to the printed specification, lines 6 and 7, "to MRX Corporation, Hawthorne, Calif., a corporation of California" should read -- to Disc Pack Corporation, Hawthorne, Calif., a corporation of California --.

Signed and sealed this 20th day of October 1970.

(SEAL)
Attest:

Edward M. Fletcher, Jr.
Attesting Officer

WILLIAM E. SCHUYLER, JR.
Commissioner of Patents